(12) United States Patent
Kelly

(10) Patent No.: US 8,807,182 B2
(45) Date of Patent: Aug. 19, 2014

(54) AUTOMATIC TIRE PRESSURIZING AND MAINTAINING SYSTEM AND METHOD

(76) Inventor: Steven Jerome Kelly, Hastings, MN (US)

( * ) Notice: Subject to any disclaimer, the term of this patent is extended or adjusted under 35 U.S.C. 154(b) by 0 days.

(21) Appl. No.: 12/774,843

(22) Filed: May 6, 2010

(65) Prior Publication Data

US 2010/0282388 A1 Nov. 11, 2010

Related U.S. Application Data

(60) Provisional application No. 61/215,719, filed on May 8, 2009.

(51) Int. Cl.
*B60C 23/12* (2006.01)
*F04B 35/00* (2006.01)

(52) U.S. Cl.
USPC .......................... 152/419; 152/427; 417/233

(58) Field of Classification Search
USPC .......... 152/415, 418, 419, 427; 417/211, 233, 417/231; 137/224, 465.18, 565.18
See application file for complete search history.

(56) References Cited

U.S. PATENT DOCUMENTS

| | | | | |
|---|---|---|---|---|
| 1,330,072 | A * | 2/1920 | Geddes | 152/418 |
| 1,875,874 | A * | 9/1932 | Johnson | 152/418 |
| 2,021,646 | A * | 11/1935 | Crandall | 152/425 |
| 2,095,489 | A * | 10/1937 | Cotton | 152/426 |
| 4,349,064 | A | 9/1982 | Booth | |
| 4,651,792 | A | 3/1987 | Taylor | |
| 5,409,049 | A | 4/1995 | Renier | |
| 5,556,489 | A | 9/1996 | Curlett et al. | |
| 5,558,730 | A | 9/1996 | Olney et al. | |
| 6,401,743 | B1 * | 6/2002 | Naedler | 137/224 |
| 6,533,010 | B1 | 3/2003 | Alonso et al. | |
| 6,691,754 | B1 | 2/2004 | Moore | |
| 6,744,356 | B2 | 6/2004 | Hamilton et al. | |
| 6,772,812 | B1 * | 8/2004 | Hamilton | 152/415 |
| 7,117,910 | B2 | 10/2006 | Akahori | |
| 7,225,845 | B2 | 6/2007 | Ellmann | |
| 7,284,585 | B2 * | 10/2007 | Ogawa | 152/419 |
| 7,322,392 | B2 * | 1/2008 | Hawes | 152/419 |
| 8,052,400 | B2 * | 11/2011 | Isono | 417/233 |
| 2005/0274442 | A1 * | 12/2005 | Huang et al. | 152/415 |
| 2006/0283534 | A1 | 12/2006 | Hawes | |
| 2007/0107822 | A1 | 5/2007 | Loewe | |
| 2007/0151648 | A1 | 7/2007 | Loewe | |
| 2008/0308206 | A1 * | 12/2008 | Okada | 152/419 |
| 2009/0107602 | A1 * | 4/2009 | Kabakov | 152/427 |

OTHER PUBLICATIONS

International Search Report for International Application No. PCT/US2010/033819, pp. 1-2, Jul. 20, 2010.

\* cited by examiner

*Primary Examiner* — Kip T Kotter
(74) *Attorney, Agent, or Firm* — Roger Belfay

(57) ABSTRACT

The present invention provides an automatic tire pressurizing and regulating system. The system maintains a predetermined pressure in a pneumatic tire during rotation of the tire. The system comprises a fill valve, one or more pumping devices, and a belt that provides fluid pathways that allow fluid (e.g., air) to flow between the outside atmosphere, the pumping device(s), and the tire as needed to maintain the predetermined pressure.

4 Claims, 12 Drawing Sheets

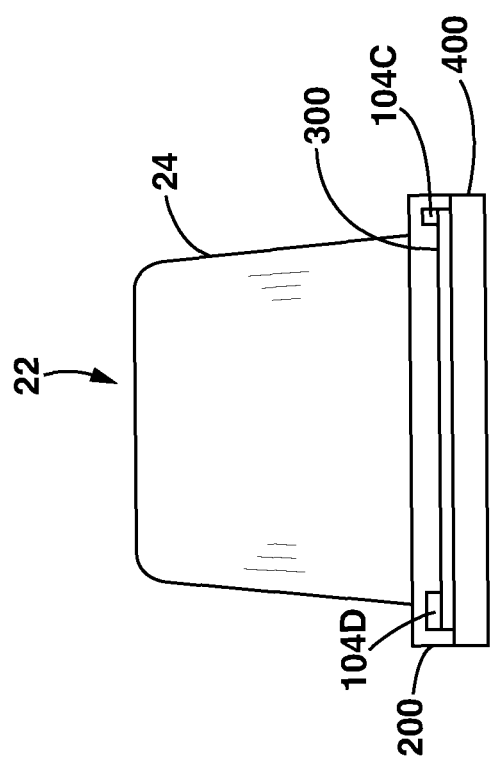

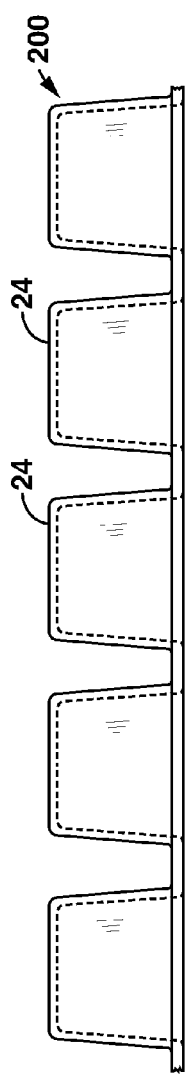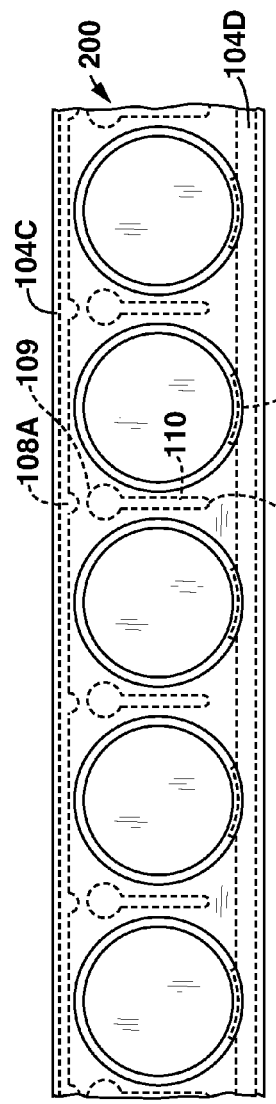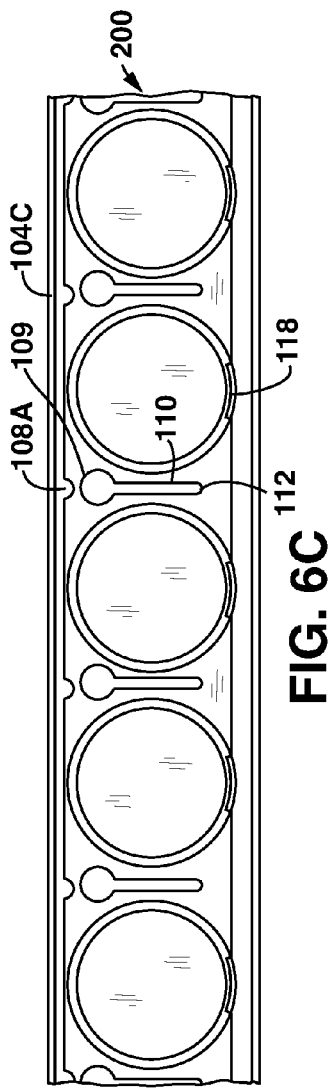

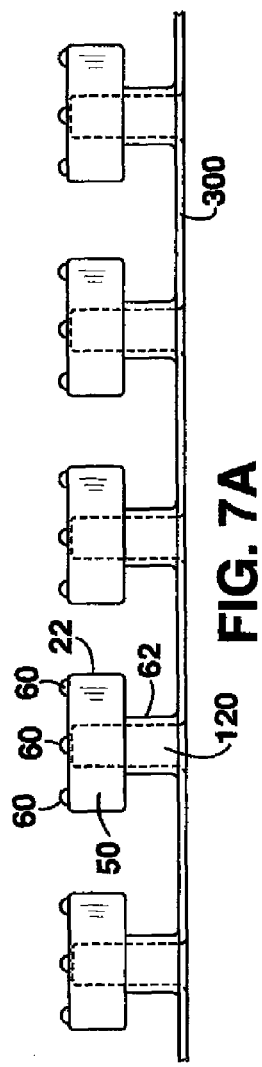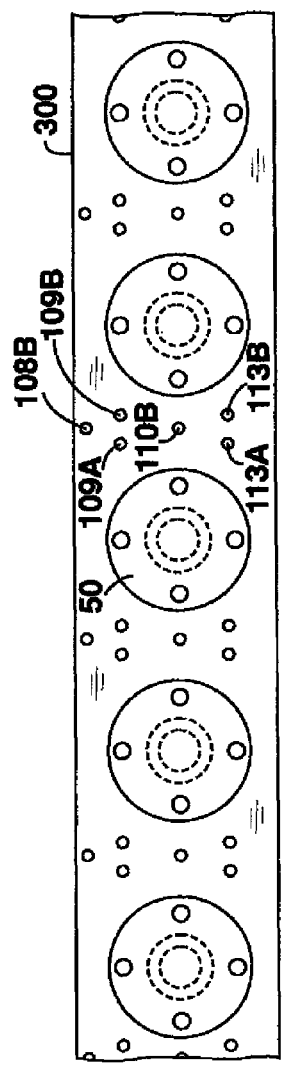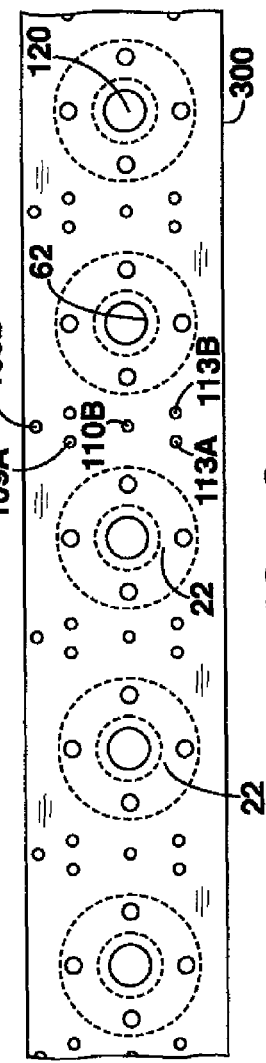

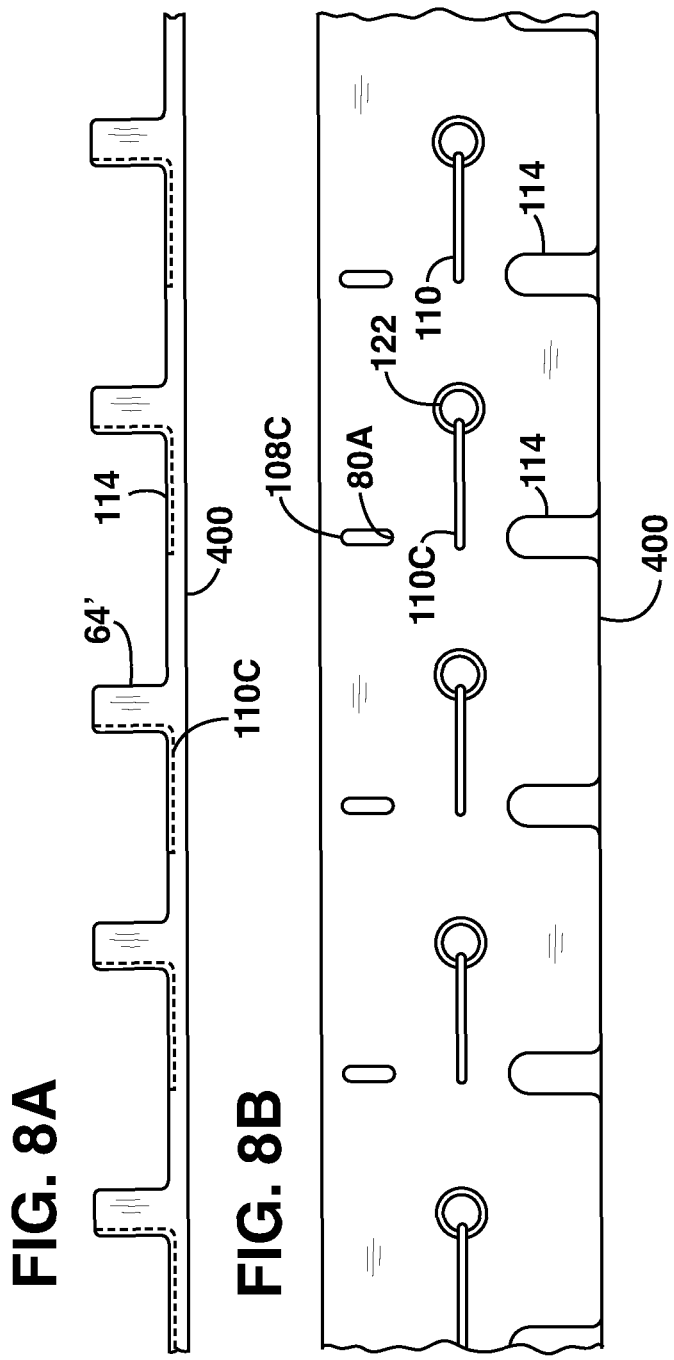

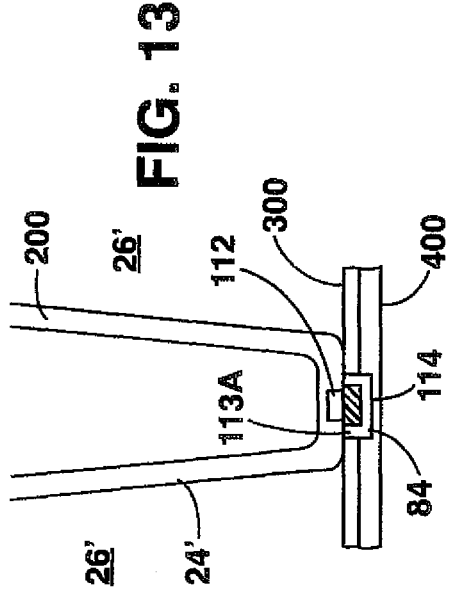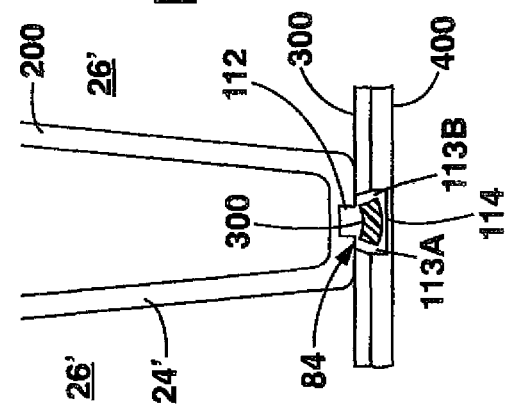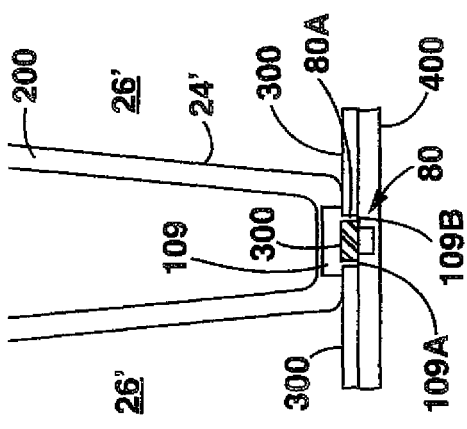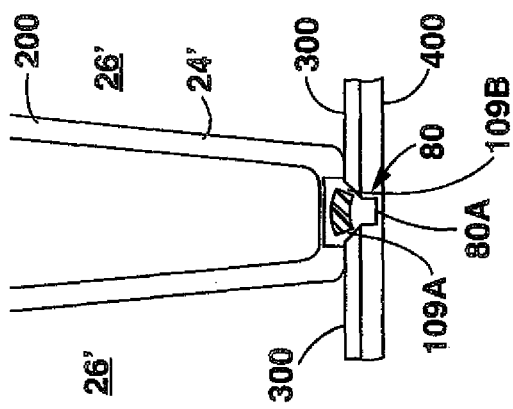

AUTOMATIC TIRE PRESSURIZING AND MAINTAINING SYSTEM AND METHOD

PRIORITY

This application claims the benefit of U.S. Provisional Application Ser. No. 61/215,719 filed May 8, 2009 entitled AUTOMATIC TIRE PRESSURIZING AND MAINTAINING SYSTEM AND METHOD, which is hereby incorporated by reference in its entirety for all purposes.

FIELD OF THE INVENTION

The present invention relates to an automatic tire pressurizing and maintaining system especially useful for maintaining a desired pressure in pneumatic tires, and to a method for the maintaining a desired pressure in pneumatic tires.

BACKGROUND

Automobiles, trucks, motorcycles, all-terrain vehicles, trailers, bicycles, etc. all employ pneumatic tires. Maintaining the proper pressure in the tires of these vehicles is an important factor in their safe handling, in minimizing excessive tire wear, and in achieving maximum fuel efficiency.

It is estimated that pneumatic tires can lose up to 2 pounds per square inch (psi) of pressure per month unless the pressure is properly monitored and maintained. Pressure is lost from pneumatic tires due to migration of air through the tire itself, small holes in the tire, air passing through the bead seal located at the junction of the tire and the rim, and/or leaks through the rim and the fill valve. However, vehicle operators frequently fail to monitor tire pressure often enough, and consequently do not maintain proper pressure in the tires.

There have been a number of systems proposed for automatically maintaining and/or adding air to pneumatic tires. See for example, U.S. Pat. Nos. 4,349,064; 5,556,489; 5,558,730; 6,553,010; 6,772,812; and 7,225,845. These systems have not proven to be entirely satisfactory. For example, some require a separate opening, in the rim in addition to that needed for the valve stem of the tire. This creates an added opportunity for the loss of air from the tire over time. Other systems require modification to the tire, the rim, or to the vehicle itself. Others require the use of springs to operate. Over time, the springs weaken and/or become dirty thereby reducing their ability to function properly. In addition, the use of springs in the regulation of pressure generally precludes the ability to adjust pressure without additional components and manual intervention. Many systems use sliding seals that are prone to wear. The continuous operation of these seals causes additional wear upon them even if there is no need to add pressure to the tire. Some of the systems allow the tire to become unbalanced during operation due to an unequal angular momentum caused when the pumping mechanism moves in a radial direction away from the center of the tire. Even though there have been attempts to counterbalance this factor by the addition of weight opposite the pumping device, such weights are fixed to the tire and are not synchronized with the changing momentum of the pumping mechanism. As a result, this solution only partially balances the wheel if it balances it at all.

As a result, there remains a need for a system that automatically pressurizes and regulates the pressure in pneumatic tires and that preferably does so without the need to provide either any additional modifications to the wheel, vehicle, or without the use of springs.

SUMMARY

The present invention provides an automatic tire pressurizing and maintaining system that pressurizes a tire to, and maintains the pressure at, a desired pressure. The desired pressure is typically set when the tire is initially filled. However, it may be reset as desired by the user at any time.

The system of the invention is able to pump make-up air into a tire to replace air lost due to normal leakage. Typically this loss is up to 2 pounds per square inch (psi) pressure per month. A force generated when a wheel is turning powers the system of the invention. The system preferably employs multiple pumping devices joined together by a flexible belt or substrate that advantageously is comprised of two or more layers. Each of the pumping devices employs an outer housing that may have flexible or rigid sidewalls. The interior of the outer housing has a displacement mechanism that divides the interior into a regulating and pressurized reservoir set to a desired pressure, and a make-up reservoir. The displacement mechanism moves up and down inside the housing in response to the rotation of a wheel. The system also preferably employs one or more valves in the belt that open and close to allow fluid to be delivered through passageways to the tire, the reservoirs, and/or the outside atmosphere.

The system may be mounted to the rim of the wheel either inside or outside of the tire. For example, it may be pulled tight by a ratcheting mechanism. Alternatively, it may be affixed to the rim by a double-sided adhesive tape. A combination of these techniques may be used if desired.

Operation of the system is cyclic in nature. When the wheel turns at or above a predetermined speed, a force moves the displacement mechanism of the pumping device on a radial vector away from the wheel center. This draws air into the make-up reservoir. When the wheel stops turning, or the speed of the wheel drops below the predetermined speed, the force is removed and air contained in the regulating and pressurized reservoir, which has previously been set to a desired pressure, acts on the displacement mechanism. If the desired pressure in the regulating and pressurized reservoir is greater than the pressure in the tire, the displacement mechanism is forced toward the center of the wheel and air is forced onto the tire. If the desired pressure is equal to, or less than, the pressure in the tire, then no air is pumped into the tire.

In one embodiment, the tire pressurizing and maintaining system of the invention comprises one or more pumping devices supported on a belt having conduits, also referred to herein as passageways, for transporting fluid from pressurized sources to a tire volume. Advantageously, the system of the invention also comprises an inlet valve that is in fluid communication with the belt. Preferably the inlet valve comprises a double in-line valve that permits the pressure in the regulating and pressurized reservoir and in the tire to be initially set to a desired pressure. The two are connected to one another so that when a first valve, typically a standard Schraeder valve, is activated, a second valve is also opened. The first valve in conjunction with the second valve fills or empties the tire in a standard way. The first valve is also connected to the regulating and pressurized reservoir. The first valve sets the pressure in this reservoir to the desired tire pressure. When the second valve is closed, it isolates this reservoir from the tire pressure. The first valve also seals the air in the regulating and pressurized reservoir at the same pressure as the tire when the valves are initially closed.

The use of a plurality of pumping devices provides an enhanced ability to maintain proper tire pressure. That is, this embodiment provides redundant pumping capabilities so that if one pumping device fails, one or more others is available to operate and maintain proper pressure in the tire.

The precise number of pumping devices employed in this embodiment is a matter of choice. Thus, it may comprise as few as one pumping device. Preferably, it comprises as many pumping devices as will fit around the circumference of the rim at least once.

The present invention also comprises a fill or inlet valve comprising, a valve body having at least one fluid conduit system. The fluid conduit system is in fluid communication with an air supply, and (1) a pumping device associated with the tire and wheel assembly, and (2) the interior chamber of the tire and wheel assembly. In particular, the fluid conduit system provides fluid communication between the air supply and (1) the interior chamber of the tire and wheel assembly, (2) a regulating and pressurized reservoir, (3) an ambient air supply, and (4) a make-up pressure reservoir.

The present invention also provides a pumping device comprising an outer housing that defines an enclosure. and a displacement mechanism within the housing. The displacement mechanism is moveable between raised and lowered positions within the enclosure along a longitudinal axis of the housing. The displacement mechanism divides the interior of the housing into a regulating and pressurized reservoir and a make-up reservoir.

The present invention also provides a method of maintaining a predetermined pressure in a tire and wheel assembly comprising the steps of:
  providing the automatic tire pressurizing and regulating system;
  attaching the system to a rim;
  pressurizing the interior chamber of the tire/rim assembly and the pressurizing and regulating reservoir to a desired pressure;
  rotating the tire and rim assembly.

Important aspects of the present invention include the use of a regulating and pressurized reservoir set at a desired pressure to drive the displacement mechanism of the pumping device; a fill valve that enables the regulating and pressurized reservoir to be filled or emptied either independently or simultaneously; a belt structure that allows a plurality of pumping devices to be synchronized because the set pressure of each is the same; and the use of one-way pressure differential valves in the belt structure to control/regulate the flow of fluid to or from the various reservoirs and/or the tire chamber.

BRIEF DESCRIPTION OF THE DRAWINGS

The present invention will be discussed in more detail with regard to the several FIGS. in which like reference numbers refer to the same elements throughout the several views. The FIGS. illustrate one or more embodiments of the invention. However, the FIGS. are not intended to, nor do they, limit the scope of the invention to these embodiments.

FIG. 5 is an end profile view of the system of FIG. 3.

FIGS. 6A-6C illustrate the side, top, and bottom views of the top layer of the belt of the embodiment of FIG. 3.

FIGS. 7A-7C illustrate the side, top, and bottom views of the middle layer of the belt of the embodiment of FIG. 3.

FIGS. 8A-8B illustrate the side and top views of the bottom layer of the belt of the embodiment of FIG. 3.

FIGS. 11-14 illustrate the inlet and outlet valves of the system of FIG. 3.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figures 1, 2:
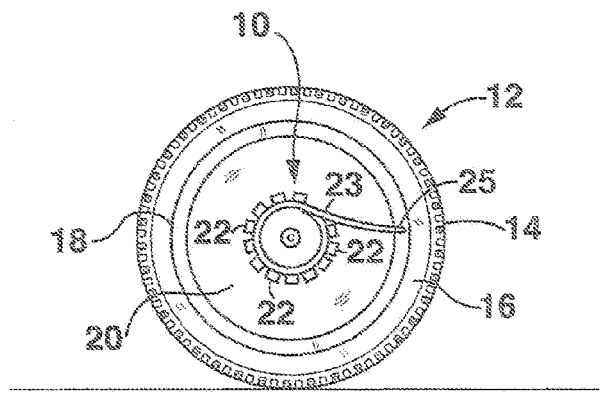
FIG. 1 schematically illustrates the system of the present invention present attached to a wheel.
FIG. 2 schematically illustrates the automatic pressurizing and regulating system of the present invention with the displacement mechanism of the pumping device at an intermediate position.

FIG. 1 schematically shows an automatic regulating and pressurized system 10 of the invention mounted to a tire 12 of a motor vehicle (not shown). Generally, for a tire and rim in good condition in which the tire is properly mounted on the rim, the rate of pressure loss can be moderately slow, but is reported to be on the order of about 2 pounds of pressure loss per month in many instances. Advantageously, the present invention helps to protect against these kinds of pressure losses. System 10 automatically regulates and maintains the tire pressure at a desired set pressure. The system 10 has many advantages, including but not limited to being elegantly simple, self-regulating, light weight, balanced for smooth tire operation, easy to install, able to fit a wide range of rim sizes, and that does not require, if desired, an independent source of power other than the rotational energy of the tire to which system 10 is mounted.

As seen in FIG. 1, tire 12 includes tread 14 and sidewall 16. Tire 12 is mounted to rim 18. Tire chamber 20 is filled to pressurize the tire 12 at a desired pressure. Many tires are mounted such that a tire bead (not shown) of tire 12 engage side flanges (not shown) projecting from the inside and outside peripheries of the rim. Tire pressure helps to create a secure, generally airtight engagement between tire 12 and rim 18.

System 10 is mounted to rim 18. Whereas the tire bead generally engages the inner and outer regions of the rim, system 10 is preferably wrapped around a central region of the rim. System 10 can be secured to rim 18 in a variety of ways. For instance, system 10 can be pulled tight using a ratcheting closure system analogous to the ratchet mechanism used on cable ties. Other attachment strategies can involve the use of adhesive, double-sided tape, or the like. In an illustrative embodiment, system 10 is secured to rim 18 using a combination of a ratcheting closure system and double-sided tape.

System 10 includes a plurality of pumping devices 22 supported upon belt 23. Lines for fluidly transporting gases, such as ambient air or gases from pressurized sources, etc. are integrated into the structure of belt 23. The pumping devices 22 are arrayed generally uniformly around the rim 18 for good balance as tire 12 rotates. Belt 23 also advantageously includes a valve stem 25.

FIG. 2 schematically shows the pump design of the system 10 of the present invention with respect to one of the pumping devices 22 shown in FIG. 1. Pumping device 22 generally includes a housing 24 that defines a regulating and pressurized reservoir 26 that can be set at a desired set pressure. The pressure of the reservoir 26 helps to control the automated monitoring and pressurizing operations of many embodiments of the present invention. Housing 24 includes a port 28 that provides a way to intake and/or exhaust a pressurized fluid into reservoir 26. In other embodiments, separate inlet (s) and outlet(s) can be provided if desired.

A fluid pathway system is provided for supplying a pressurized fluid to reservoir 26 through port 28. The fluid pathway system optionally includes features to allow the pressure of the reservoir 26 to be released. A conduit 30 leads from a suitable source 32 of pressurized fluid to the port 28. The source 32 can be any suitable source of pressurized gas. A conduit 34 also provides a pathway to release pressure from reservoir 26. Valves 36, 38, and 40 control the flow of fluid through the fluid pathway system. Valve 36 can be opened to allow fluid to flow through conduit 42 to fill the tire chamber 20. Valve 38 can be opened to allow fluid to fill reservoir 26. Valve 40 can be opened to exhaust fluid from reservoir 26. Dotted line 44 schematically shows that the actuation of valves 36 and 38 can be coordinated. For instance, both can be opened at the same time so that the reservoir 26 and the tire chamber 20 are inflated or deflated at the same time to the same desired pressure. Then, both valves 36 and 38 can be closed at the same time to isolate the reservoir 26 and tire chamber 20 from the ambient. Note that when both of these valves are closed, reservoir 26 is also isolated from tire chamber 20 as well. This way, if tire chamber 20 loses pressure, the pressure in reservoir 26 is maintained and remains available to help regulate tire chamber re-pressurization. Although shown separately, valves 36 and 38, or any combination of valves used in the system for that matter, may be combined into a single valve device.

Pump 22 employs a displacement mechanism 48 that is based in part upon a weighted displacement cylinder 50 that moves up and down upon a post 64 (sometimes referred to hereinafter as piston 64). As illustrated in FIG. 2, cylinder 50 is in an intermediate position within housing 24. A make-up reservoir 54 has a volume that changes as the cylinder 50 moves radially outward away from the axis of rotation of tire 12 as depicted by arrow 56 or radially inward toward the axis of rotation of tire 12 as depicted by arrow 58. When the cylinder moves in the direction of arrow 56, the volume of make-up reservoir 54 increases. This is the intake motion, as this causes a make-up fluid to be drawn into reservoir 54. When the cylinder moves in the direction of arrow 58, the volume of make-up reservoir 54 decreases. This tends to forcibly exhaust make-up fluid in reservoir 54 into tire chamber 20 for re-pressurization. The make-up reservoir 54 is isolated from the regulating and pressurized reservoir 26. Protuberances 60 on the top of cylinder 50 desirably are made of a resilient material, such as a rubber, to cushion any impact between the cylinder 50 and housing 24. The protuberances 60 also help to maintain a gap between the cylinder 50 and the housing 24 at the maximum intake stroke.

Flexible portion 62 is provided on cylinder 50. As illustrated in FIG. 2, flexible portion 62 folds in upon itself in an accordion-like manner. The flexible portion 62, also sometimes referred to herein as the bellows portion 62, allows the volume of the make-up reservoir 54 to expand and contract as the cylinder 50 moves up and down. Preferably, bellows portion 62 expands and contracts with little or de minimis bias acting on the cylinder 50. Optionally, though, the bellows portion 62 may have an elastic character that biases the cylinder 50 toward the intake or exhaust position when bellows portion 62 is stretched or compressed.

A post 64 guides cylinder 50 to help it to track properly. Post 64 is hollow and allows fluid to enter and leave make-up reservoir 54 via passageway 68.

The system also includes a fluid pathway by which a make-up fluid can be drawn into make-up reservoir 54 during an intake stroke. In this illustrative mode of practice, conduits 72 and 74 fluidly couple a source 76 of a make-up gas to the passageway 68. This source 76 can be ambient air, one or more supplies of pressurized gas, or the like. Valve 80 helps control the flow of make-up fluid through this fluid pathway.

The system also includes a fluid pathway by which make-up fluid can be forced from make-up reservoir 54 into tire chamber 20. This pathway includes conduits 68, 74, 82, and conduit 83 leading to tire chamber 20. Valve 84 helps to control the flow of make-up fluid through this fluid pathway.

Optionally, the actuation of valves 80 and 84 can be coordinated as schematically depicted by the dotted line 86 connecting these two valves. For instance, the control logic can assure that when valve 80 is open, valve 84 can be closed and vice versa. Thus, valve 80 can be open and valve 84 can be closed when the cylinder 50 takes an intake stroke. On the other hand, valve 84 can be open and valve 80 can be closed after an intake stroke is completed. This facilitates an exhaust stroke when the pressure in tire chamber 20 is too low relative to the background pressure in reservoir 26.

Importantly, when valve 84 is open and valve 80 is closed, both the pressure of reservoir 26 and the tire pressure in chamber 20 act in opposition against cylinder 50. This design advantageously allows the pressure of reservoir 26 to serve as at least a portion of a very simple automatic regulating system to control tire re-pressurization. For instance, in one mode of practice, the system can be designed so that the background pressure is at the desired tire pressure, and the system induces re-pressurization when the pressure in tire chamber 20 is less than the pressure of reservoir 26. To start with, the make-up reservoir 54 fills readily when the tire rotates at or above a certain threshold speed. In this circumstance, the rotational speed of the tire allows the cylinder to move against the pressure in the reservoir 26 to take an intake stroke. Make-up fluid is drawn into the reservoir 54 from a suitable source, such as ambient air or the like, as the volume of reservoir 54 expands. This allows the make-up reservoir 54 to at least partially fill with make-up fluid. Advantageously, it is the energy of tire rotation that powers the filling of the make-up reservoir 54. An independent power supply is not needed.

With make-up fluid in the reservoir 54, the system is now ready to controllably execute a re-pressurization event when the tire slows sufficiently or stops. The relative pressure difference between the set pressure in reservoir 26 and the pressure in tire chamber 20 determines, at least in part, whether an exhaust stroke occurs. If the set pressure in reservoir 26 is greater than the pressure in tire chamber 20, then the set pressure can force the cylinder 50 to take an exhaust stroke. In practical effect, the set pressure acting against the cylinder 50 in the exhaust direction is greater than, and overcomes, the tire pressure acting on the cylinder 50 in the intake direction. If the tire pressure is equal to or greater than the set pressure, then the tire pressure is high enough to prevent an exhaust stroke. In this way, re-pressurization of tire chamber 20 automatically occurs when needed, and over-pressurizing is avoided.

The system 10 is essentially unaffected by gravity. Thus when a tire stops rotating, or when a tire begins to rotate, the force acting on the device of the invention is negligible. The distance covered when a tire creeps to a stop, or when it creeps on start-up, only needs to be one revolution to bring each device 22 under maximum or minimum gravitational influence. The elasticity of bellows 62 can be varied to increase or decrease the gravitational force on cylinder 50.

The system 10 advantageously accommodates temperature changes. When the temperature of air or other fluid in the tire changes, there is a corresponding change in the tire pressure. The fluid providing set pressure in reservoir 26 is located inside the tire envelope and therefore would be expected to change by a similar corresponding amount. Consequently, system 10 can accurately control tire pressure over a wide temperature range.

Figure 3:
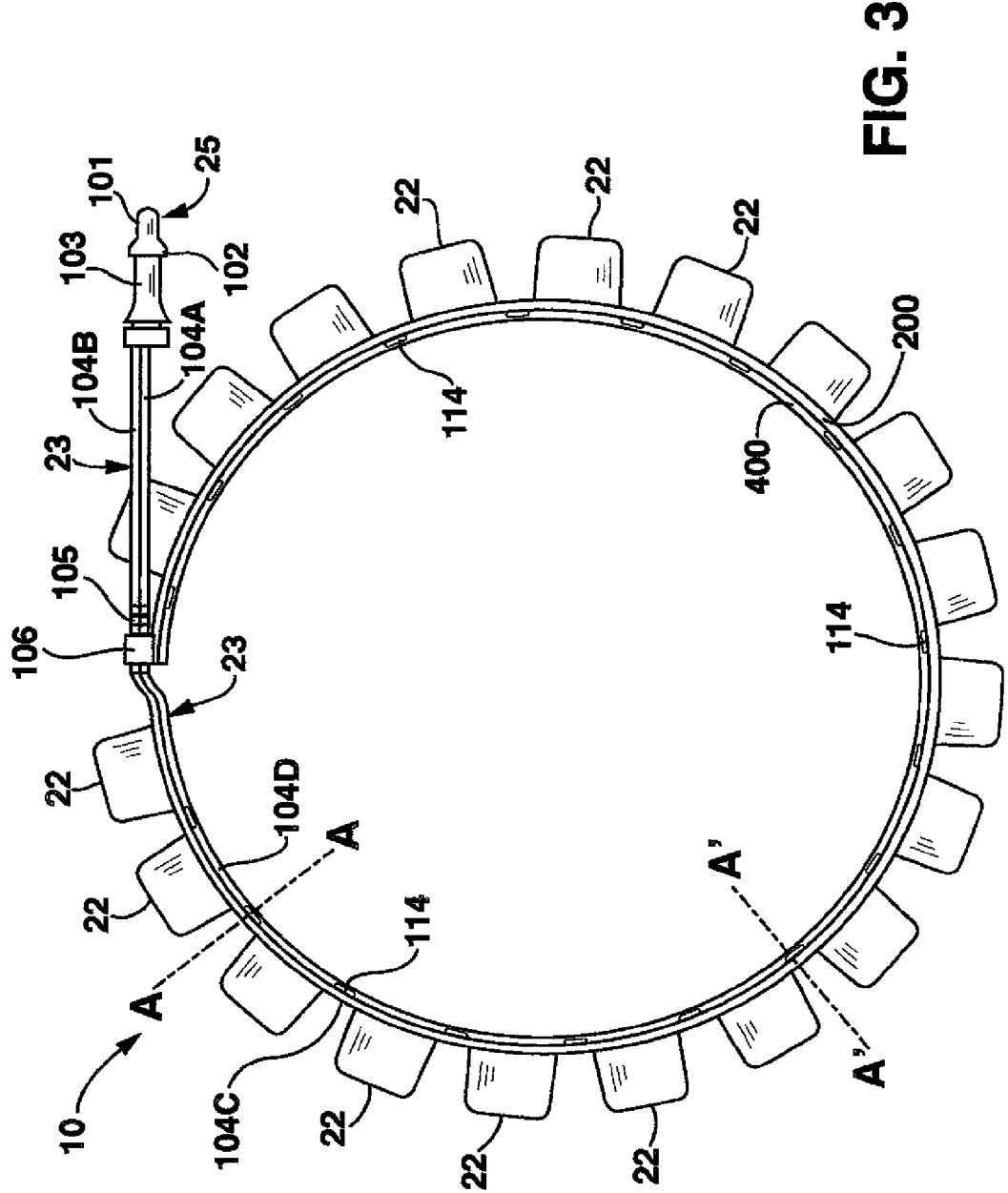
FIG. 3 is a side view of an embodiment of the system of FIG. 1 illustrating a plurality of the pumping devices connected to one another by a flexible belt that includes a fill valve.

FIG. 3 shows a system 10 according to the invention in more detail. System 10 comprises a plurality of pumping devices 22 connected to one another in series by belt 23. Belt 23 provides fluid communication pathways between the individual pumping devices 22, the tire chamber 20, and the outside fluid supply. System 10 further comprises a fill valve 25 having a cover 101, preferably a perforated skirt 102 that filters intake air, and a housing 103. Housing 103 preferably contains two Schraeder-type valves. These two valves are preferably connected in an in-line manner for mutual operation. One of the Schraeder-type valves controls air communication between fill valve 25 and tire chamber 20. The other of the Schraeder-type valves controls air communication between the pressurizing and regulating reservoir 26 and fill valve 25. Fill valve 25 further comprises a fluid conduit 72 that connects it to inlet valves 80 and 84 (see FIG. 2) of the pumping devices 22.

Belt 23, as shown, comprises two parts. The first comprises two air channels 104A and 104B that conduct air to the air intake valves and the pressurizing and regulating reservoirs of each of the pumping devices 22 respectively. This portion of belt 23 is sufficiently flexible to facilitate the insertion of the fill valve 25 into a valve-mounting hole (not shown) of a wheel (sometimes referred to herein as a rim). A connecting system is preferably provided that joins the air channels 104A and 104B to the series of pumping devices 22. The connecting system shown comprises a ratchet-type connector 105 and a pawl-type receiver 106 that is adapted to interface with the ratchet-type connector 105. The connecting system connects the first and second parts of belt 23 and joins channels 104A and 104B to channels 104C and 104D respectively provide fluid communication between the valve 25 and the series of pumping devices 22. Other connecting systems may also be used as will be understood by those skilled in the art. Alternatively, belt 23 may comprise a single part, thereby eliminating the use of a connecting system.

Belt 23 further comprises layers 200 and 400, discussed more fully below. Layer 400 contains a series air outlets 114 that allow air to flow into tire chamber 20 from the one-way pressure differential valves 84 (see FIG. 2) that are connected to the displacement chambers 54. This portion also contains a channel 108C that forms the intake air valve seat of the one-way pressure differential valve 80 (see FIG. 2) that is connected to channel 104C.

Figure 4:
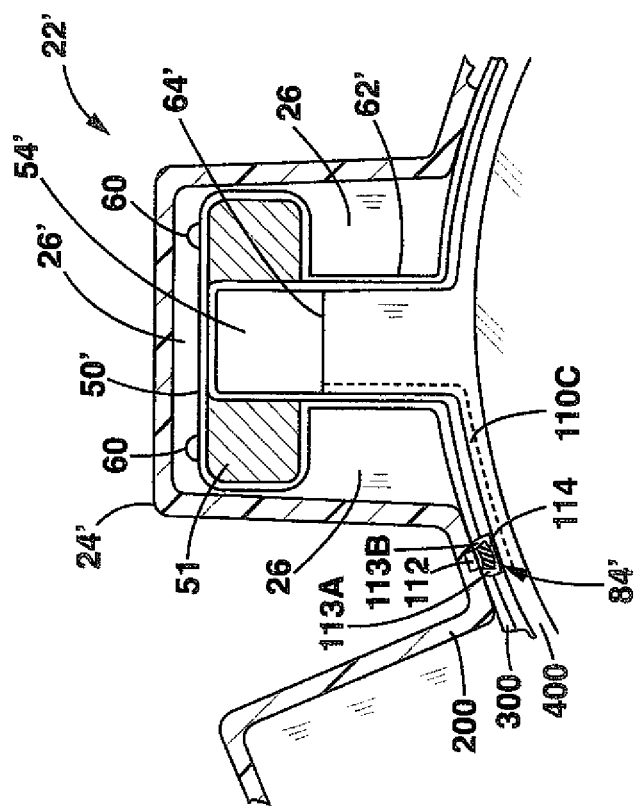
FIG. 4 is a cut away perspective view of one of the pumping devices of FIG. 3.

FIG. 4 shows an alternative embodiment of a pumping device 22' useful in the invention. Pumping device 22' comprises a housing 24', a pressurizing and regulating reservoir 26', cylinder 50', make-up reservoir 54', and pressure differential valve 84'. Cylinder 50' comprises a weight 51 and protuberances 60. A flexible substrate 62', optionally surrounds weight 51. A post 64' is also provided that has a channel 110C that allows fluid to enter and leave make-up reservoir 54'. Also shown are terminus 112, holes 113A and B, channel 114, and layers 200, 300, and 400, all of which are discussed below with respect to FIGS. 6A-9.

FIG. 5 shows an end profile view of an assembled pumping device 22. The pumping device 22 comprises housing 24, layers 200, 300, and 400 of the belt 23, channel 104D that connects fill valve 25 to the pressurizing and regulating reservoir 26 (not shown), and fluid intake channel 104C.

The various individual components of the system of the invention will now be discussed with reference to FIGS. 6A-10 which show the structure and inter-relation of the various components of the belt 23. Specifically, these FIGS. show a segment of belt 23 taken along the segment line A-A through A'-A' of FIG. 3.

FIGS. 6A-6C respectively show side, top, and bottom views of the top layer 200 of the segment. Top layer 200 forms reservoir 26. Top layer 200 further comprises air intake channel 104C that is communication with ambient atmospheric air via the valve 25. A portion 108A of the air intake channel 104C communicates with hole 108B in the middle layer 300 (see FIG. 7B) and the inflow side 108C of the pressure differential valve 80 (see FIG. 8B2).

The combination of portion 108A, hole 108B, and the inflow side 108C of valve 80 allows air to pass from the top layer 200 through the middle layer 300 into the bottom layer 400 to the inlet side of inlet valve 80.

Layer 200 further comprises opening 109, slot 110 and terminus 112. Opening 109 forms the outflow side of the intake valve 80 and is centered over, and in communication with, both of holes 109A and 109B of FIGS. 7B-7C. Terminus 84A (FIG. 8B) provides the seat for the inflow side of valve 80. In the closed position, terminus 84A is covered by the space between 109A and 109B in layer 300. In the open position the portion of layer 300 between openings 109A and 109B is forced into channel 109 (FIG. 6C) due to the pressure differential. This allows air to pass through openings 109A and 109B (FIGS. 7B and 7C) into channel 110. Slot 110 is connected to via hole 110B (see FIGS. 7B and 7C) to the channel 110C (see FIG. 8B), which is in turn in communication with make-up reservoir 54'.

Terminus 112 is positioned to lie directly above the space between openings 113A and 113B (see FIGS. 7B and 7C). Terminus 112 provides the seat for the inflow side of outlet valve 84. In the closed position, terminus 112 is covered by the space between openings 113A and 113B. In the open position, the portion of layer 300 between openings 113A and 113B is forced into the channel 114 (see FIG. 8B) due to the pressure differential. This allows air to pass through openings 113A and 113B (see FIGS. 7B and 7C). Channel 104D is provided in layer 200 to connect the Schraeder-type valve and all of the pressurizing and regulating reservoirs 26' via openings 118. It should be noted that while the one-way valves 80 and 84 are shown with a single opening, they may alternatively be provided with multiple openings.

FIGS. 7A-7C show additional detail regarding the structure of middle layer 300. In addition to the elements already discussed, layer 300 comprises cylinder 50. Cavity 120 is provided in the weight diaphragm assembly. Cavity 120 is adapted to receive post 64 (see FIG. 8A).

FIGS. 8A-8B show additional detail regarding the structure of bottom layer 400. These FIGS. show the positions of the inflow side 108C of the pressure differential inlet 80A of check valve 80, the channel 110C that is connected to hole 110B (FIG. 7B) and slot 110 (FIG. 6C), and the post 64'.

Figure 9:
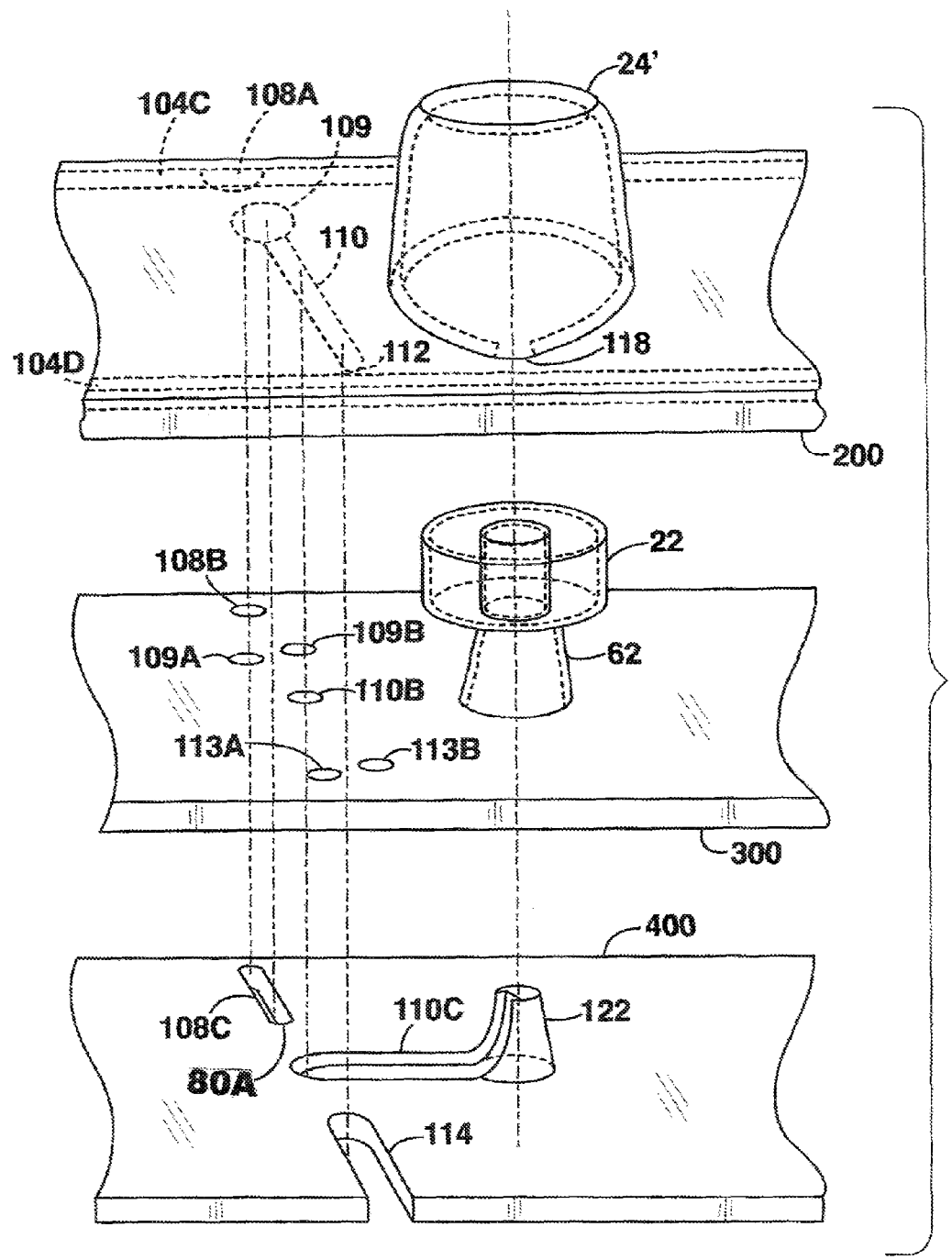
FIG. 9 is an exploded view of the device showing the relationship of the three layers of FIGS. 6A-8B.

FIG. 9 is an exploded isometric view showing the relationship of the layers 200, 300, 400 to one another when assembled. This FIG. illustrates how the network of fluid passageways cooperates in the present invention.

Once assembled, layers 200, 300, 400 provide a means to connect a number of pumping devices 22 to one another and to valve 25. The layers also provide a network of passageways the allowed fluid (e.g., air) to flow to the various chambers and/or reservoirs as needed.

Layers 200, 300, and 400 may comprise any flexible material capable of maintaining its structural integrity during use. For example, they may be metal foils, plastic materials, rubbery materials, etc. The layers may be joined to one another by a variety of techniques, including an adhesive composition heat welding or, alternatively, an adhesive tape such as a double-sided adhesive tape. In either case, the joinder technique must provide the necessary fluid passageways so as to allow fluid flow between the layers as already discussed.

Figure 10:
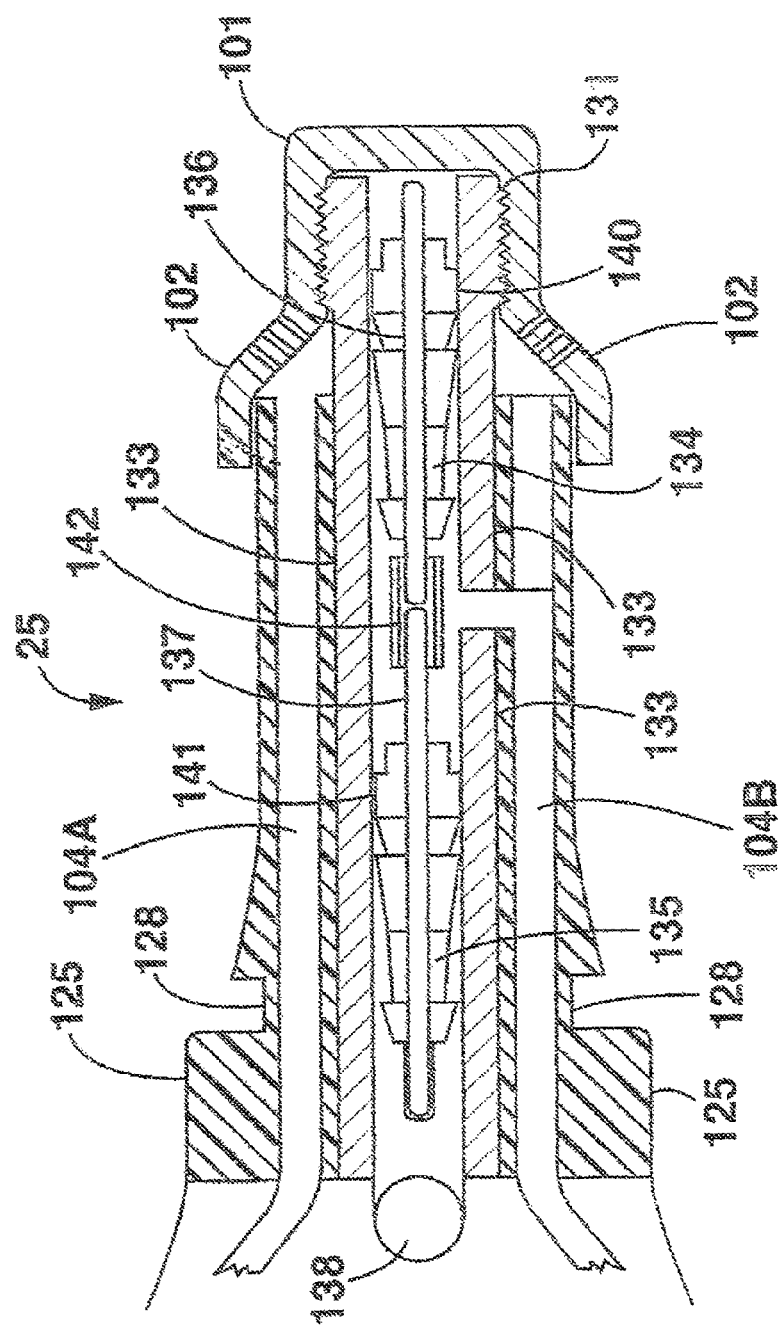
FIG. 10 illustrates a fill valve according to the invention.

FIG. 10 shows an embodiment of the valve 25 of the invention having two in-line valves. Fill valve 25 comprises a valve body 125 and a valve cover 101 having a threaded portion 131 to secure it to the valve. Valve cover 101 further comprises a perforated skirt portion 102. A threaded insert 133 is provided in valve body 125. Insert 133 preferably holds standard valve cores 134 and 135 in proper position. The valve cores 134 and 135 are each shown with standard threaded collars 140 and 141. The threaded collars help to seal the cores to the valve body. Valve core activation stems 136 and 137 are positioned along the longitudinal axis of valve cores 134 and 135. The activation stems are aligned with one another and are movable along the longitudinal axis of the valve cores. An optional coupling mechanism 142 is attached to activation stems 136 and 137 to allow simultaneous operation of valve cores 134 and 135.

Fill valve 25 additionally comprises an intake air conduit 104A that connects ambient air to the inlet valves 80 of pumping device 22. Fill valve 25 further comprises air channel 138 that connects the reservoirs 26 with the tire chamber 20 and the fill or empty port of fill valve 25. Channel 138 also allows the tire chamber 20 to be filled or emptied via face of valve core 135. Fill valve 25 further continuously fluidly isolates the make-up reservoir 54 from the regulating and pressurized reservoir 26 and the tire chamber 20 except when the fill valve operates to inject air into or release air from the tire chamber and the regulating and pressurized reservoir.

As shown in FIG. 10, the valve body 125 may comprise two halves that are joined together by, for example, adhesive, heat welding, etc. Insert 133 may then be inserted into valve body 125. Activation stems 136 and 137 are then typically joined together via optional coupling mechanism 142 and the resulting assembly inserted into an opening in valve cores 134 and 135. This resulting combination may then be placed into insert 133 either before or after it was inserted into valve body 125.

FIGS. 11 and 12 respectively schematically illustrate the inlet valve 80 in closed and open positions. These FIGS. show housing 24' surrounding regulating and pressurized reservoir 26', the inlet side 80A of inlet valve 80, and flexible middle layer 300 having holes 109A and 109B that communicate with opening 109 of layer 200.

FIGS. 13 and 14 schematically illustrate the operation of the outlet valve 84 in closed and open positions respectively. These FIGS. show housing 24' surrounding reservoir 26' and outlet valve 84. Outlet valve 84 comprises inlet side 84A, also identified as terminus 112, and middle layer 300. Middle layer 300 is flexible and has holes 113A and 113B that communicate with channel 114 of layer 400.

Inlet valve 80 and outlet valve 84 are preferably mirror images of one another. This facilitates the operation of the system of the invention. Thus, the mass of the outlet valve 84 biases it in the closed position and the mass of the inlet valve 80 biases it in the open position when the force generated by rotation of the tire is applied.

Figure 15:
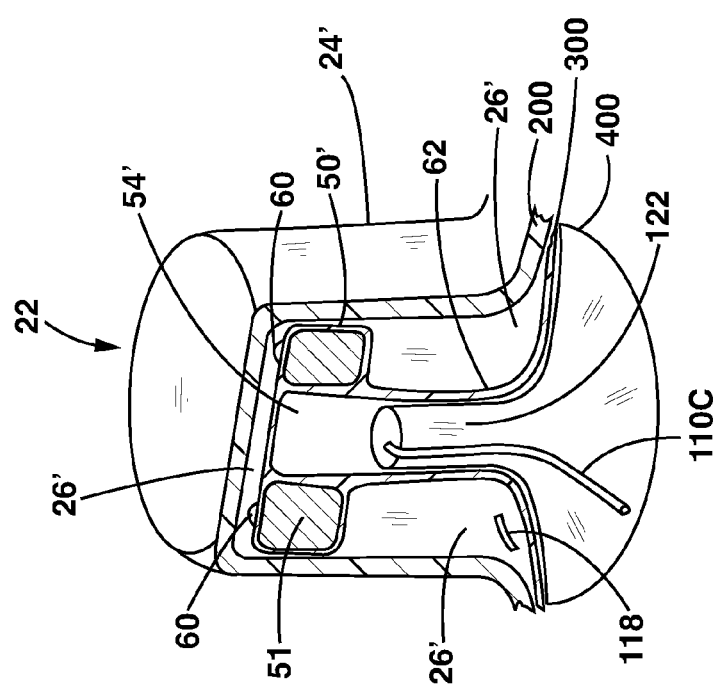
FIGS. 15 and 16 are cut away perspective views of a pumping device useful in the system of the invention at maximum intake and maximum compression respectively.
Figure 16:
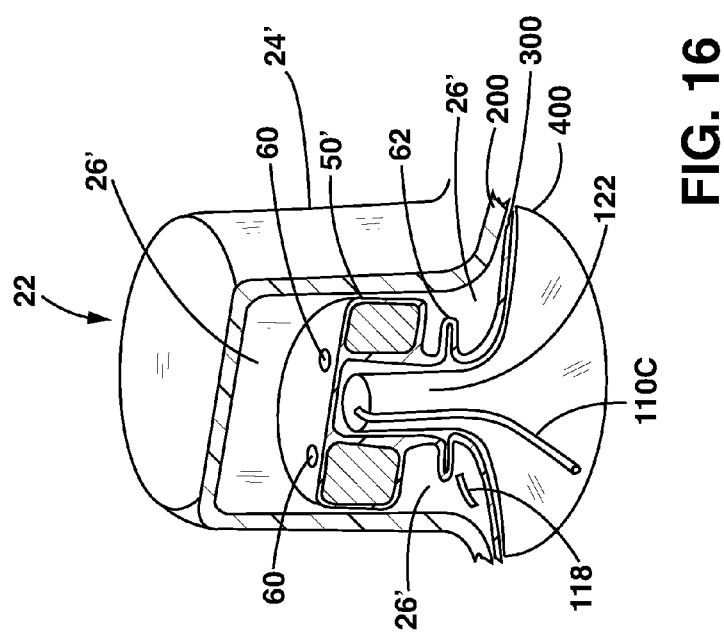

FIGS. 15 and 16 illustrate an assembled pumping device 22' useful in the invention at maximum intake and maximum compression respectively. These FIGS show housing 24', regulating and pressurized reservoir 26', cylinder 50' comprising weight 51, flexible substrate 62, protuberances 60, make-up reservoir 54', post 122, inlet air channel 110C, and inlet 118 from 104D to the reservoir 26'. Also shown are layers 200, 300 and 400.

The system of the invention may be applied to the rim in a variety of ways. FIG. 1 illustrates one such approach in which fill valve 25 is inserted into a valve mounting port (not shown) in the rim. Fill valve 25 preferably has a channel 128 (FIG. 10) that cooperates with the rim to provide an air tight seal. The remainder of system may then be secured to the inner circumference of the rim as previously discussed.

The number and size of the pumping devices employed in system is a matter of design choice, it being understood that the number and size should be sufficient to adequately maintain the desired tire pressure. The number and size of the regulators can be determined from the following: Assume a tire size of 215/70/15 (a 15 inch tire). Tire air volume equals 2500 in.sup.3. Desired pressure in tire equals 35 psi. Assume a pressure loss of 2 psi per month. This equals a volume loss of 140 in.sup.3 or 325 in.sup.3 at atmospheric pressure. Assume 20 start/stop cycles per day, where a cycle means exceeding 25 mph and then slowing to below 25 mph. Assume the use of 20 regulators. 20 regulators provide 12,000 pumping cycles per month, using the previous assumptions. Dividing the volume loss of 325 in.sup.3 per month by 12,000 pumping cycles give a pumping volume of 0.027 in.sup.3/ stroke. Assume a stroke length of 0.5 in. This results in a displacement area of 0.06 in.sup.2 and a pump diameter of 0.28 in. To pump against 35 psi of force requires a force of 2.1 lb (35 psi.times.0.06 in.sup.2) for each regulator. The centripetal force acting on the weight is then calculated using the formula f=v.sup.2/rm where f is the centripetal force, v is the velocity of the pump the wheel rotates, r is the radius length from the center of the wheel to the pump, and m is the mass of the weight in the pump. A weight positioned 7 in from the center of the wheel (the distance of the regulator from the center of the wheel) traveling at a speed of 25 mph (velocity is 5.4 revolutions per second) will exert a force of 21 times its weight at rest. Therefore, to operate the pump at 25 mph, a mass of 0.1 lb (2.1 lb/21) is needed in each regulator in order to draw air into each. The air pressure in the set pressure reservoir (i.e., 35 psi) will act on the weight/diaphragm and push against the air in the displacement reservoir. If the pressure in the set pressure reservoir is greater than the tire pressure, then air will be forced into the tire from the displacement reservoir.

The forgoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The complete disclosures of the patents, patent documents, and publications cited herein are incorporated by reference in their entirety as if each were individually incorporated. Various modifications and alternations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

The invention claimed is:

1. An automatic tire pressurizing and regulating system for maintaining a predetermined air pressure in a tire and wheel assembly, comprising one or more pumping devices supported on a belt, the belt having fluid pathways for transporting fluid from an ambient air source to an interior chamber of the tire and wheel assembly, a fill valve in communication with the fluid pathways and the pumping devices, the pumping devices having a regulating and pressurized reservoir, a make-up reservoir, and a piston continuously separating the two reservoirs, wherein the fill valve comprises a valve body having a fluid conduit system, the fluid conduit system being in fluid communication with a pressurized air supply port and (1) the interior chamber of the tire and wheel assembly, the regulating and pressurized reservoir, an ambient air supply, and the make-up reservoir, said make-up reservoir fluidly isolated from said regulating and pressurized reservoir within the pumping devices except when said fill valve operates to inject into or release air from the interior chamber, of the tire and wheel assembly, and regulating and pressurized reservoir.

2. A method of pressurizing and maintaining a predetermined pressure in a tire and wheel assembly comprising the steps of: A) providing the system of claim 1; B) attaching the system to the wheel, said system held in place by tension surrounding a rim; C) pressurizing the interior chamber of the tire and wheel assembly and the regulating and pressurized reservoir to a predetermined pressure; and D) rotating the tire and wheel assembly.

3. A fill valve for use with a system to pressurize and maintain a predetermined pressure in a tire and wheel assembly comprising, a valve body having first and second fluid conduits, the first fluid conduit being in fluid communication with a pressurized air supply port, and an interior chamber of the tire and wheel assembly, and a regulating and pressurized reservoir; the second fluid conduit in fluid communication with an ambient air supply and a make-up reservoir and the interior chamber of the tire and wheel assembly, said make-up reservoir continuously fluidly isolated from said regulating and pressurized reservoir within the pumping device, except when said fill valve operates to inject into or release air from the interior chamber of the tire and wheel assembly and regulating and pressurized reservoir.

4. A pumping device for use with a system to automatically maintain a predetermined pressure in a tire and wheel assembly comprising, a pump having an outer housing that defines an enclosure, a piston within the enclosure that is movable between raised and lowered positions within the enclosure along a longitudinal axis of the outer housing, the piston defining both a regulating and pressurized reservoir and a make-up reservoir within the housing, said make-up reservoir continuously fluidly isolated from said regulating and pressurized reservoir within the pumping device except when a fill valve operates to inject into or release air from an interior chamber of the tire and wheel assembly, and regulating and pressurized reservoir.

* * * * *